(12) United States Patent
Rajasekar (10) Patent No.: US 10,552,293 B2
(45) Date of Patent: Feb. 4, 2020

(54) LOGGING AS A SERVICE

(71) Applicant: Manikandan Rajasekar, Chennai (IN)

(72) Inventor: Manikandan Rajasekar, Chennai (IN)

(73) Assignee: SAP SE, Walldorf (DE)

( * ) Notice: Subject to any disclaimer, the term of this patent is extended or adjusted under 35 U.S.C. 154(b) by 1013 days.

(21) Appl. No.: 14/631,530

(22) Filed: Feb. 25, 2015

(65) Prior Publication Data

US 2016/0248642 A1 Aug. 25, 2016

(51) Int. Cl.
*G06F 15/173* (2006.01)
*G06F 11/34* (2006.01)
*H04L 29/08* (2006.01)

(52) U.S. Cl.
CPC ...... *G06F 11/3466* (2013.01); *G06F 11/3476* (2013.01); *H04L 67/02* (2013.01); *G06F 2201/865* (2013.01)

(58) Field of Classification Search
CPC .. H04L 67/02; G06F 11/3476; G06F 11/3466; G06F 2201/865
See application file for complete search history.

(56) References Cited

U.S. PATENT DOCUMENTS

| 9,645,891 | B2 * | 5/2017 | Ahn | G06F 11/1461 |
|---|---|---|---|---|
| 2012/0233547 | A1 * | 9/2012 | McLachlan | G06Q 10/06 715/733 |
| 2012/0240240 | A1 * | 9/2012 | Naslund | H04L 63/0428 726/26 |
| 2013/0227352 | A1 * | 8/2013 | Kumarasamy | G06F 11/3072 714/47.1 |

\* cited by examiner

*Primary Examiner* — Glenton B Burgess
*Assistant Examiner* — Rachel J Hackenberg
(74) *Attorney, Agent, or Firm* — Lam P. Doan; Fountainhead Law Group PC (57) ABSTRACT

Techniques are described for managing log data generated by software applications. The techniques can be implemented in a cloud-based infrastructure capable of collecting and analyzing log data generated by software applications through logging and tracing. Logging and tracing are techniques for monitoring the execution of the software applications. The techniques include a processing step where log data is screened before it is saved within log storage and an analyzing step where saved log files are retrieved or analyzed.

20 Claims, 6 Drawing Sheets

```
Log: {
    customer.id: 12345678901234568
    application.id : app1234689
    deployment.id : 234rtgen
    sync.time: 03.12.2014 00.33.12
    logData:[ {
        log.id: 001
        log.timestamp : 03.12.2014 00.13.12
        log.name: 001_log_trace
        log.logtext: "Method A is executed from module1".
        log.description : "Method A is executed from module1 on 03.12.2014 00.13.12 time.
    },{
        log.id: 002
        log.timestamp : 03.12.2014 00.23.12
        log.name: 002_log_trace
        log.logtext: "View generated for user interaction."
        log.description : "View generated for user interaction on 03.12.2014 00.23.12 time.
    },{
        log.id: 003
        log.timestamp : 03.12.2014 00.30.12
        log.name: 001_log_trace
        log.logtext: "Method C is executed from module 2 successfully.".
        log.description : "Method C is executed from module 2 successfully. on 03.12.2014
00.30.12 time.
    }]
}
```

LOGGING AS A SERVICE

BACKGROUND

During the software design and development process, a software application crated by a software vendor can generate log files which log or trace the execution of the software application. The log files can be subsequently analyzed by the software vendor to identify issues with the software application. For example, the log files can be used to uncover bugs, which are then solved to improve the quality of software application. In some instances, software applications can generate log files during customer live usage. These log files can be analyzed to improve the software application. Logs from different software usages by consumers will provide more information about software/transaction usage and its evolvement over period of time. Analysis of these logs help identify commons problem that exist within the software application.

However, accessing these log files are difficult due to cumbersome processes to access the logs. Most of applications does not follow any standard way of logging information due to different implementations, different technology platforms, different application types, different application kind (local/remote), etc. Thus, each software application has its own process for accessing log files. As a result, a vendor administrator has to first log in with admin rights and second follow application specific processes to access the log files.

Typically these log files can vary from few KBs to multiples of GBs. The log files also grow exponentially over time. On mobile devices and other devices with limited storage, the log files occupies memory which can be used for other tasks. Therefore, we need a better mechanism to manage log files.

SUMMARY

In one embodiment, a computer-implemented method receives, by a processor, a request from a log agent operating on a client device, the log agent being configured to log or trace a vendor application running on the client device. The method then establishes, by the processor, a web-based connection with the log agent. The method then receives, by the processor and over the web-based connection, log data generated by the log agent, the log data being generated during execution of the vendor application running on the client device. The method then determines, by the processor, a consumer preference setting associated with the client device. The method then stores, by the processor, the log data in a log storage according to the customer preference setting.

In one example, the method further includes receiving, by the processor, a vendor request for analysis related to the vendor application, identifying, by the processor, at least one log file that is related to the vendor application, and generating, by the processor, log analysis based on the at least one log file.

In another example, the request further includes a location parameter configured to specify a location to conduct the sequence of interviews and generating the proposed interview schedule comprises filtering, by the processor, the availability data according to the location parameter and analyzing, by the processor, the filtered availability data to schedule the sequence of interviews. In one instance, the at least one log file includes a first log file and a second log file and wherein the first log file includes data generated during the execution of the vendor application on a first technology platform and the second log file includes data generated during the execution of the vendor application a second technology platform.

In another example, storing the log data in the log storage includes identifying, by the processor, a storage mode from the customer preference setting, storing, by the processor, the log data in a row within a table when the storage mode is tableOnly, storing, by the processor, the log data in a log file when the storage mode is fileOnly, and storing, by the processor, metadata associated with the log data in a row within a table and the log data in a log file when the storage mode is tableAndFile.

In another example, storing the log data in the log storage includes identifying, by the processor, an identifier associated with a consumer operating the vendor application and storing, by the processor, the log data in the log storage along with the identifier.

In another example, the web-based connection is maintained during a runtime of the vendor application.

In another example, the log data includes a header containing data describing the source of the log data and a payload that includes a plurality of log entries.

In another embodiment, a non-transitory computer readable storage medium stores one or more programs comprising instructions for receiving a request from a log agent operating on a client device, the log agent being configured to log or trace a vendor application running on the client device, establishing a web-based connection with the log agent, receiving, over the web-based connection, log data generated by the log agent, the log data being generated during execution of the vendor application running on the client device, determining a consumer preference setting associated with the client device, and storing the log data in a log storage according to the customer preference setting.

In another embodiment, a computer implemented system comprises one or more computer processors and a non-transitory computer-readable storage medium. The non-transitory computer-readable storage medium comprises instructions, that when executed, control the one or more computer processors to be configured for receiving a request from a log agent operating on a client device, the log agent being configured to log or trace a vendor application running on the client device, establishing a web-based connection with the log agent, receiving, over the web-based connection, log data generated by the log agent, the log data being generated during execution of the vendor application running on the client device, determining a consumer preference setting associated with the client device, and storing the log data in a log storage according to the customer preference setting.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Described herein are techniques for managing log data generated by software applications. The techniques can be implemented in a cloud-based infrastructure capable of collecting and analyzing log data generated by software applications through logging and tracing. Logging and tracing are techniques for monitoring the execution of the software applications. The techniques include a processing step where log data is screened before it is saved within log storage and an analyzing step where saved log files are retrieved or analyzed.

Figure 1:
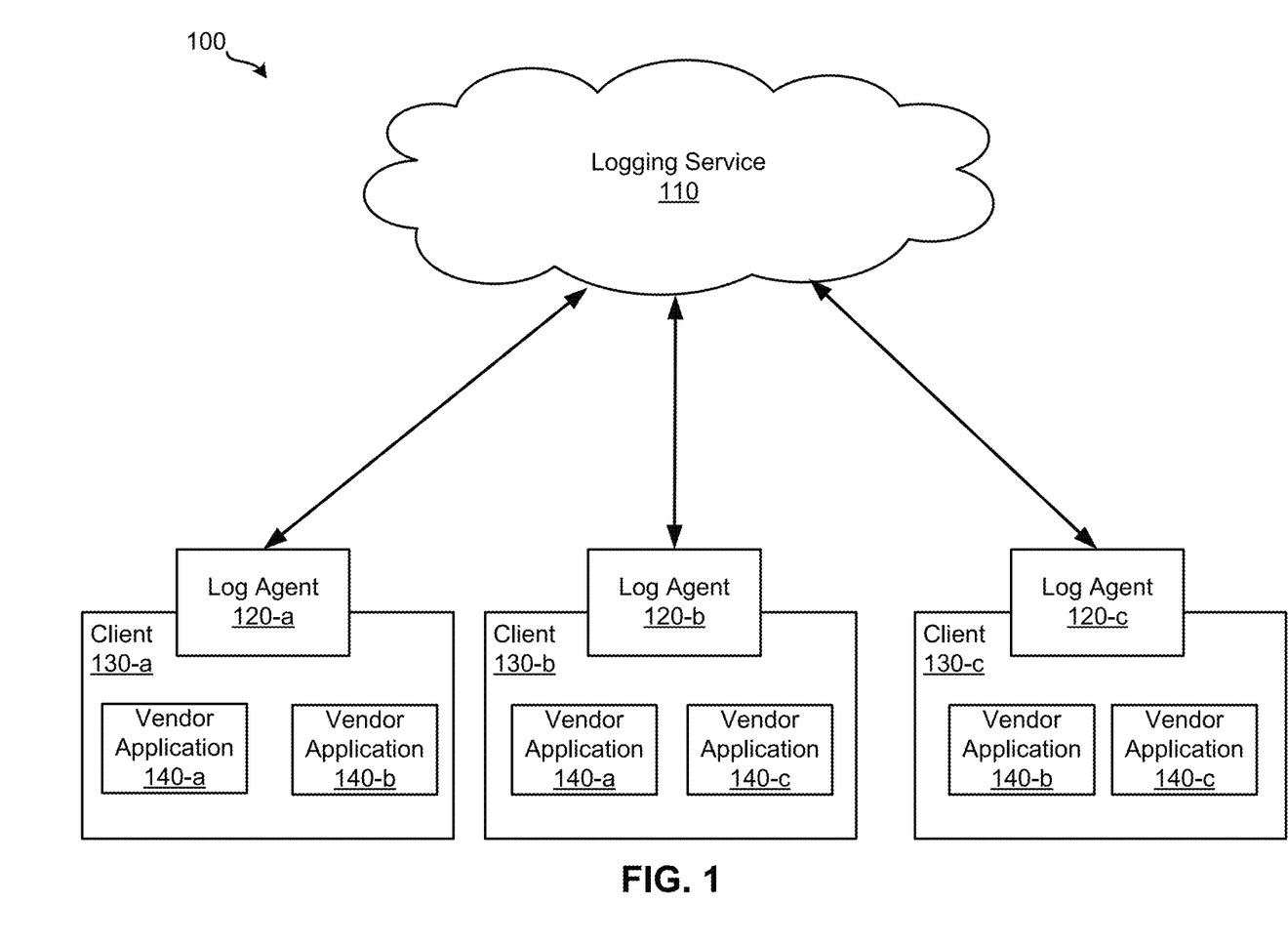
FIG. 1 illustrates a system for providing a logging service according to one embodiment.

FIG. 1 illustrates a system for providing a logging service according to one embodiment. The logging service can be provided to a software vendor. System 100 includes clients 130-*a*, 130-*b*, and 130-*c*. Each client can include one or more vendor applications. Each vendor application is a software application created by the software vendor. As the clients run the vendor applications, each vendor application can perform tracing and logging to monitor the performance and problems with the vendor application. As shown here, each client can run different vendor applications. For example, client 130-*a* is running vendor applications 140-*a* and 140-*b*. Client 130-*b* is running vendor applications 140-*a* and 140-*c*. Thus, client 130-*a* and 130-*b* are both running vendor application 140-*a*. Client 130-*c* is running vendor application 140-*b* and 140-*c*. Thus, client 130-*a* and 130-*b* are both running vendor application 140-*c*.

System 100 further includes log agents 120-*a*, 120-*b*, and 120-*c*. Each log agent can provide an interface for applications and other software running on the client. Given that different software applications can generate log data having various formats, the log agent can provide an interface to translate the different formats into a central format. The log agent can also provide configurations for storing the log data within logging service 110. The configurations can include user information, application information, and end user preferences. In some embodiments, log agent can fetch log data associated with a software application running within the client and store the log data within logging service 110. Once the log data has been saved, the log agent can clear the log data from the client thus freeing up resources which can be used by other applications and software running on the client.

In one embodiment, a vendor can complete a registration with logging service 110 to create an account within logging service 110. The registration process can assign physical storage to the account for storing log data, specify an indexing method for sorting the log data, and specify a mining service for comparing and analyzing logs. A unique vendor ID can also be generated. Various applications such as enterprise application, web application, mobile application, and desktop applications can integrate with logging service 110 through the user of a log agent. The log agent can also assist in integrating different operating systems and platforms.

Figure 2:
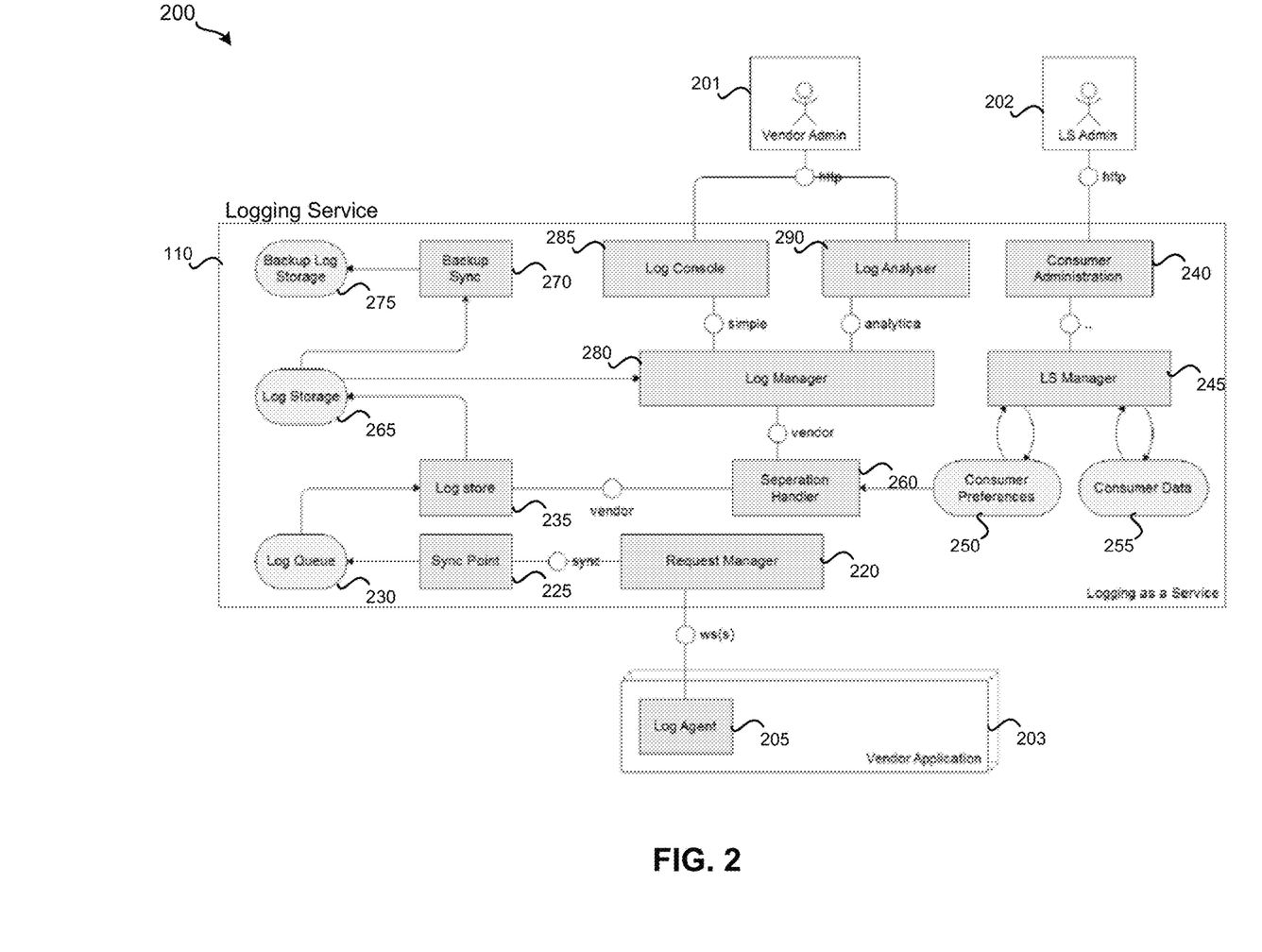
FIG. 2 illustrates a detailed system of a logging service according to one embodiment.

FIG. 2 illustrates a detailed system of a logging service according to one embodiment. System 200 includes logging service 110. Logging service 110 can interact with vendor administrator 201, logging administrator 202, and vendor application 203. Vendor application 203 can generate log data and transmit the log data to logging service 110 for storage or analysis. Logging administrator 202 can perform administrative tasks such as specifying preferences of consumers using vendor application 203. For example, logging administrator 202 can specify which consumers are to be logged and traced. As another example, logging administrator 202 can register a consumer into logging service 110 and specify what should be logged for the consumer. For instance, logging administrator 202 can specify the portions of vendor application 203 what are to be logged for the consumer. Vendor administrator 201 can access logging service 110 to retrieve log data or to review analysis generated from the log data. In some examples, vendor administrator 201 and logging administrator 202 can communicate with logging service 110 through a web portal. For example, vendor administrator 201 and logging administrator 202 can communicate with logging service 110 by utilizing a web browser to access a web site of logging service 110.

In one example, a vendor that developed vendor application 203 wishes to receive feedback on vendor application 203. As a result the vendor can submit a request to logging administrator 202 that logging is to be performed on vendor application 203. Logging administrator 220 can in turn register the vendor within logging service 110. Registration can include the generation of a vendor ID for the vendor and setting consumer parameters that specify details on how the vendor application 203 should be logged. As described in FIG. 1, a vendor application can be running on multiple clients and as a result, consumer parameters can specify not only which clients are to be logged, but also what portions of vendor application 203 should be logged for each client. Once logging administrator 220 has registered vendor application 203 according to the vendor's request for logging, logging service 110 can monitor log data received from log agent 205 of vendor application 203. Log data received can be processed and stored within log service 110. Vendor administrator 201 (the vendor's representative who is monitoring the logging) can periodically communicate with logging service 110 to track the status of vendor application 203. In some examples, vendor administrator 201 can request log data or analysis on the log data.

Logging service 110 includes multiple functional modules which perform tasks to save and analyze log data generated by vendor application 203. Logging service 110 includes request manager 220. Request manager 220 is configured to handle incoming requests received from log agent 205. Each incoming request can be to transmit log data to logging service 110. In one embodiment, request manager 220 can establish a web socket based connectivity with vendor application 203 in response to an incoming request. The web socket based connectivity can be configured to for the transmission of log data from log agent 205 to request manager 220. Once the log data is received, request manager 220 can place the log data in sync point 225 for queued processing. The web socket connectivity can allow a PUSH based mechanism from log agent 205 to request manager 220. In one example, request manager 220 can provide a set of Application Programming REST interfaces for consumption tools, such as request sharing, requesting isolation, and request routing to sync point 225. In one embodiment, request manager 220 can maintain the web socket based connectivity. As a result, request manager 220 can periodically receive log data from log agent 205 over the web socket based connectivity.

Sync point 225 is configured to perform one or more preprocessing tasks on the received log data. The preprocessing tasks can be determine whether the log data should be processed by logging service 110 and potentially stored in log storage. Sync point 225 can reject log data that fails one or more preprocessing tasks. In one embodiment, a preprocessing task can include confirming that the source of the log data is one which is being logged by logging service 110. For example, sync point 225 can check whether the source is a vendor application or a consumer where logging is desired. In another embodiment, a preprocessing task can include virus scanning. Virus scanning can include virus checks provided by the technology platform like Java language, .Net Platform, and other platforms. Log data that fails the virus checks can be rejected by logging service 110. In another embodiment, a preprocessing task can include preference checks. A preference check can determine whether the log data is in the desired format or configuration. For example, the preference check can verify that the log data has the desired encryption, expected formatting, or whether a property such as a time stamp is included in the log data. For instance, preference checks can include checking whether a property such as 'storeInTimeSeries' is enabled within the log data, signifying that the log data is stored in time series and has time stamps. Log data that does not satisfy the preference checks can be rejected by logging system 110. In another embodiment, a preprocessing task can include the removal of security related or personal information from the log data. For example, log data can include personal information belonging to the consumer. Complete telephone numbers, addresses, social security number, bank information are some examples of the personal information that can be a part of the log data. The preprocessing task can remove the security related or personal information from the log data. For example, the preprocessing task can remove a portion of the personal information or replace a portion of the personal information with random data. As a result, the personal information is not stored within logging service 110.

Once sync point 225 has preprocessed the log data, the log data can enter log queue 230. Log queue 230 is configured as a temporary storage for log data waiting to be processed by log store 235. Log data can be queued up within log queue 230 and await processing by log store 235. In one example, log queue 230 can provide log data to log store 235 in a first in first out manner. When log store 235 is finished processing log data, log store 235 can request the next log data to be processed from log queue 230. This can prevent log data from being lost during times of heavy load by delaying the processing of log data until log store 235 is ready to handle additional data.

Log store 235 is configured to process log data before the log data is stored within log storage 265. In one embodiment, log store 235 can prepare separate objects for instances of individual vendor applications. Thus, each instance of vendor application 203 can have a corresponding object within log storage 265. These objects are coupled with consumer preference data so that log store 235 can handle the log separation between two users of the logging service. Log store 235 can also use customer preferences to store the log data in a single master table, a table with file mode, a separate database, etc. Log store 235 can read the log data from log queue 230 and store the log data into log storage 265. In essence, log store 235 is a database operation to write the log data as documents (e.g., log files) or table rows within a master table.

In some embodiments, log store 235 can store log data within log storage 265 using various techniques. For example, the type of information that is stored within log storage 265 and the manner in which the information is stored within log storage 265 (e.g., in a separate file or as part of a table) can vary depending on implementation details. Logging administrator 202 can communicate with logging service 110 to specify one or more preferences for configuring how log data is stored within log storage 265. Logging service 110 can include consumer administration 240 which provides a console based web application module. Logging administrator 202 can use consumer administration 240 as an interface for performing administrative tasks such as configuring how log data is stored within log storage 265. Instructions received from logging administrator 202 can be processed by the LS manager 245. LS manager 245 can be responsible for providing basic functionalities to logging administrator 202 for managing administration of logging service 110. Using LS Manager 245, the logging administrator 202 can create and register clients into the infrastructure, view consumers usage, resource utilization, accounts, preferences settings, consumer user creation, monitoring log storage 265, and other tasks such as log data retrieval and analysis. LS Manager 245 can process the instructions received from logging administrator 202, resulting in the read and write of consumer preferences into consumer preferences 250 and consumer data 255. In one example, consumer preferences can be written into a single consumer preference document, such as an XML format based document.

Examples of preferences stored in consumer preferences 250 are shown in the table below:

| Preference Name | Allowed Values | Comments |
| --- | --- | --- |
| Storage mode | tableOnly | Store log information as table rows - implies short character length |
| | fileOnly | Store log information as individual files for a customer in a specific location |
| | tableAndFile | Store log meta info as table row and textual content of the log as file. |
| Authorization on log write | default | Default token based authorization to write (access) the LS infrastructure |
| | logProvided | The access authorization will be provided along with log meta data information |
| | certificate | Server issued certificate based trust hand shake. |
| Backup Interval | hourly | Costly operation that for a specific customer logs will be taken into backup store on a regular time interval of hourly basis. |
| | daily | On daily basis (24 Hours) take the back up of logs |
| | bi-daily weekly bi-Weekly monthly | |

Examples of information stored in consumer data 255 are shown in the table below.

| |
| --- |
| Unique Identifier |
| Consumer Name |

-continued

Log Storage Mode
Creation Date and Time
App Runtime
Preference Document Id
Multi Instance allowed
Consumer User Reference Id
Consume App Reference Id
Vendor Reference ID In one embodiment, separation handler 260 can retrieve preference data or consumer data from consumer preferences 250 and consumer data 260. The retrieved information can be passed to log store 235 to configure how log data is stored within log storage 265. For example, preferences and basic information that is associated with a vendor can be retrieved by separation handler 260. The preferences and basic information can be provided to log store 235. This allows log store 235 to store the log data based on the preferences and basic information of the vendor. For instance, consumer preferences can be applied to the log data to specify how and what portions of the log data is stored within log storage 265 while consumer data 255 can specify which identifiers to attach to the log data. Thus, what portions of the log data and how the log data is stored within log storage 265 can be specified by information received from separation handler 260. Logging service 110 further includes backup sync 270 and backup log storage 275, which together manage the storage of a backup copy of log storage 265. In some examples, log storage 265 can be backed up on a predefined schedule or in response to a trigger, such as the processing of log data by log store 235.

Over time, log data from multiple instances of the vendor application can be processed by log store 235 and stored within log storage 265. At some point in time, vendor administrator 201 may desire to receive historical log information from log storage or analysis on the historical log information. Logging service 110 includes log console 285, log analyzer 290, and log manager 280 to process requests received from vendor administrator 201. In one example, vendor administrator 201 can be an employee of a software vendor that created vendor application 203. Vendor administrator 201 can be in charge of analyzing logging information generated by vendor application 203 or in charge of retrieving logging information generated by vendor application 203.

Log manager 280 can be configured to read information from log storage 265. Log manager 280 can also be configured to perform calculations, time line series check, log formatting, form generation, and other manipulations on the log information. Log console 285 is configured to process the log information read from log manager 280 such that the log information can be presented to vendor administrator 201. In one embodiment, log console 285 can present the existing logs in a table manner and allow the download of log file. Each log file can include log data associated with a given user, client, application, customer, or service. In another embodiment, log console 285 can present existing log files in a nested tree like structure which allows for the download of selected log files. Log analyzer is configured to analyze the log information read from log manager 280 and present the analyzed data to vendor administrator 201. Analysis can include identifying bottlenecks in the source code, generating analytical cubes on logs, text mining on logs, identifying problematic functionality over historical log analysis, and others. Analysis of a log file can reveal bottlenecks in the source code which can be a great input software development teams for further architecture & design refactoring. In one example, a bottleneck is identified by means of time taken for a set of code execution. In another example, a bottleneck is identified by the number of resource locks involved in a set of code execution. For instance, a function in a method can take 3 minutes to execute and take a resource cumulative lock time period of 2 minutes. This can be analyzed from log file and reported as a bottleneck for software applications. The Analytical cube generation provides details like number of errors reported against a specific set of source codes, critical & solvable issues from a specific software module, stabilization of a software module over period of time etc. The historical analysis can perform a historical log for a specific set of code with respect to source code changes as well as reports errors/ripple effect of the source code changes. Text mining is a technique to perform set of searches and derive meaningful information from software code lines.

Figure 3:
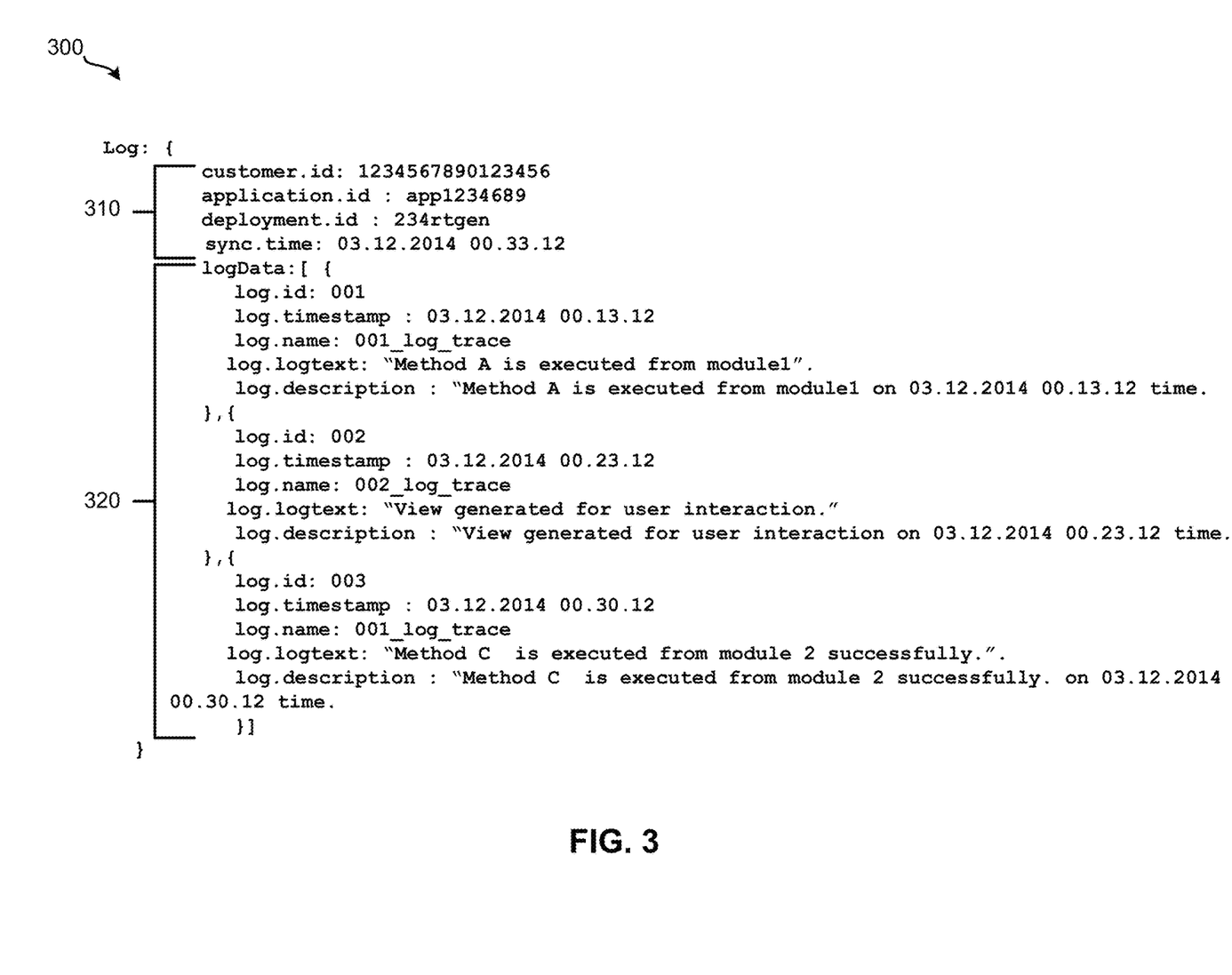
FIG. 3 illustrates an exemplary log according to one embodiment.

FIG. 3 illustrates an exemplary log according to one embodiment. As shown, log 300 includes header 310 which includes metadata on the source of the log. Header 310 includes a customer identifier, application identifier, deployment identifier, and the synchronization time. Log store 235 may verify these parameters as being valid before storing the log data into log storage 265. Log 300 further includes payload 320. Payload 320 includes a multiple log entries. Each log entry contains log information such as the log text and log description, along with a time stamp and name for each log entry.

Figure 4:
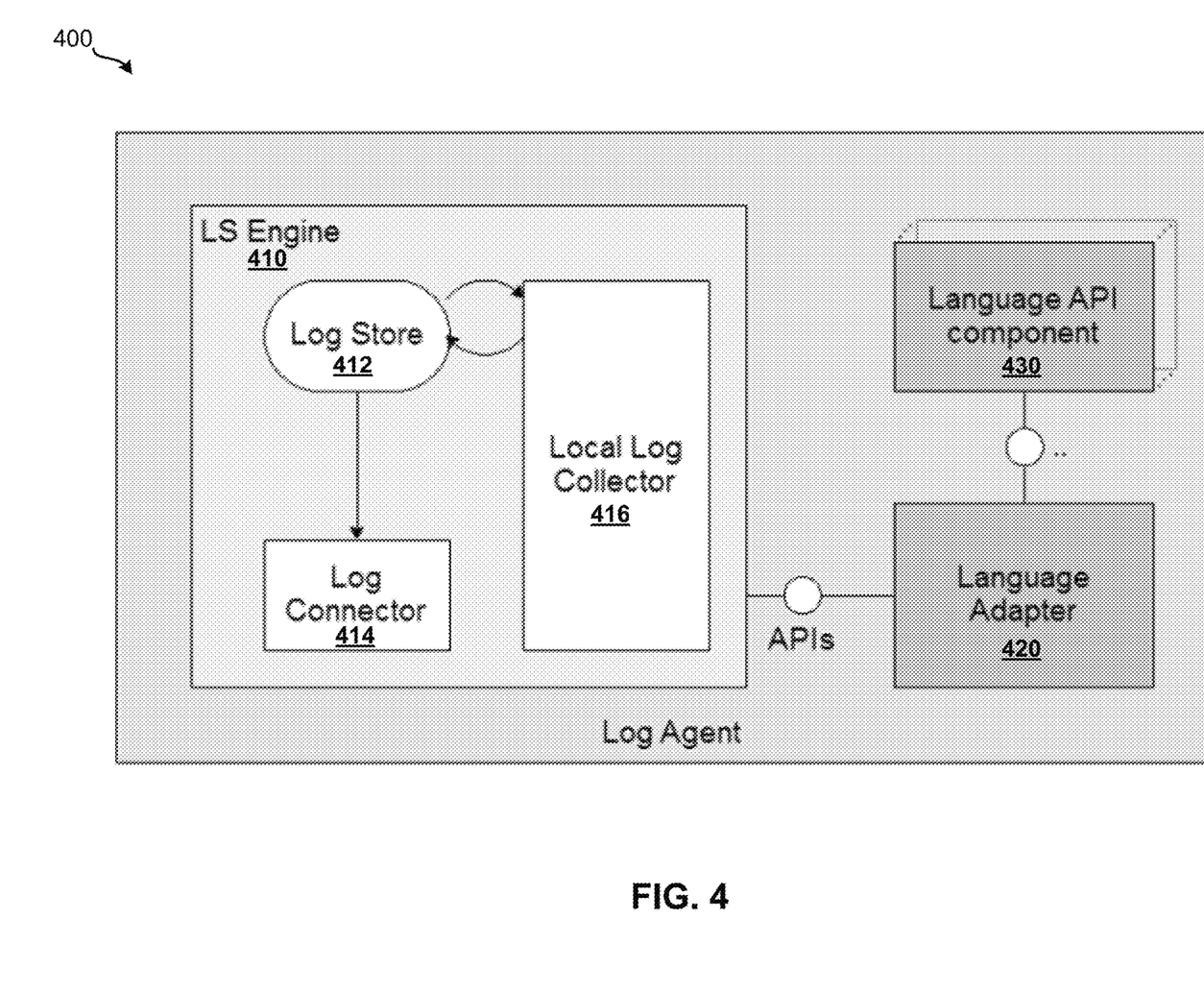
FIG. 4 illustrates a log agent according to one embodiment.

FIG. 4 illustrates a log agent according to one embodiment. Log agent 400 includes logging engine 410, language adapter 420, and language API component 430. Language API component 430 is configured to connect with various vendor applications. In one embodiment, language API component 430 can contain various interfaces and protocols in different languages such that different vendor applications can connect to log agent 400. The logging APIs of language API component 430 can be natively available in different languages and the can be configured to convert the semantics and data from a vendor application into a specific format or language that is supported by logging engine 410.

Logging service 110 can be configured to operate in different technology platforms. As a result, log agent 400 may generate log data that can be read by different technology platforms. Depending on the desired technology platform, logging engine 410 can be configured to generate log data in the desired technology platform. Given that the technology platform of logging engine 410 may be different than the technology platform of language API component, language adapter 420 can be used as a bridge between the different technology platforms.

Logging engine 410 is configured to generate logs and to transmit the generated logs to logging service 110. For example, the generated logs can be transmitted to request manager 220. Logging engine 410 includes log store 412, log connector 414, and local log collector 416. Local log collector 416 is configured as a write module which generates logs. Local log collector 416 can monitor the execution of the vendor application and generate logs based on the execution. Log store 412 is configured as a temporary memory storage for the logs. Log store 412 can capture log entries created by local log collector 416. Once the log entries reach a predefined threshold, log store 412 can transmit the log entries in log store 412 to log connector 414. Log connector 414 is configured to maintain a connection to logging service 110. For example, log connector 414 can maintain a connection to request manager 220. The connection can be maintained for the lifetime of the runtime of the underlying vendor application.

Figure 5:
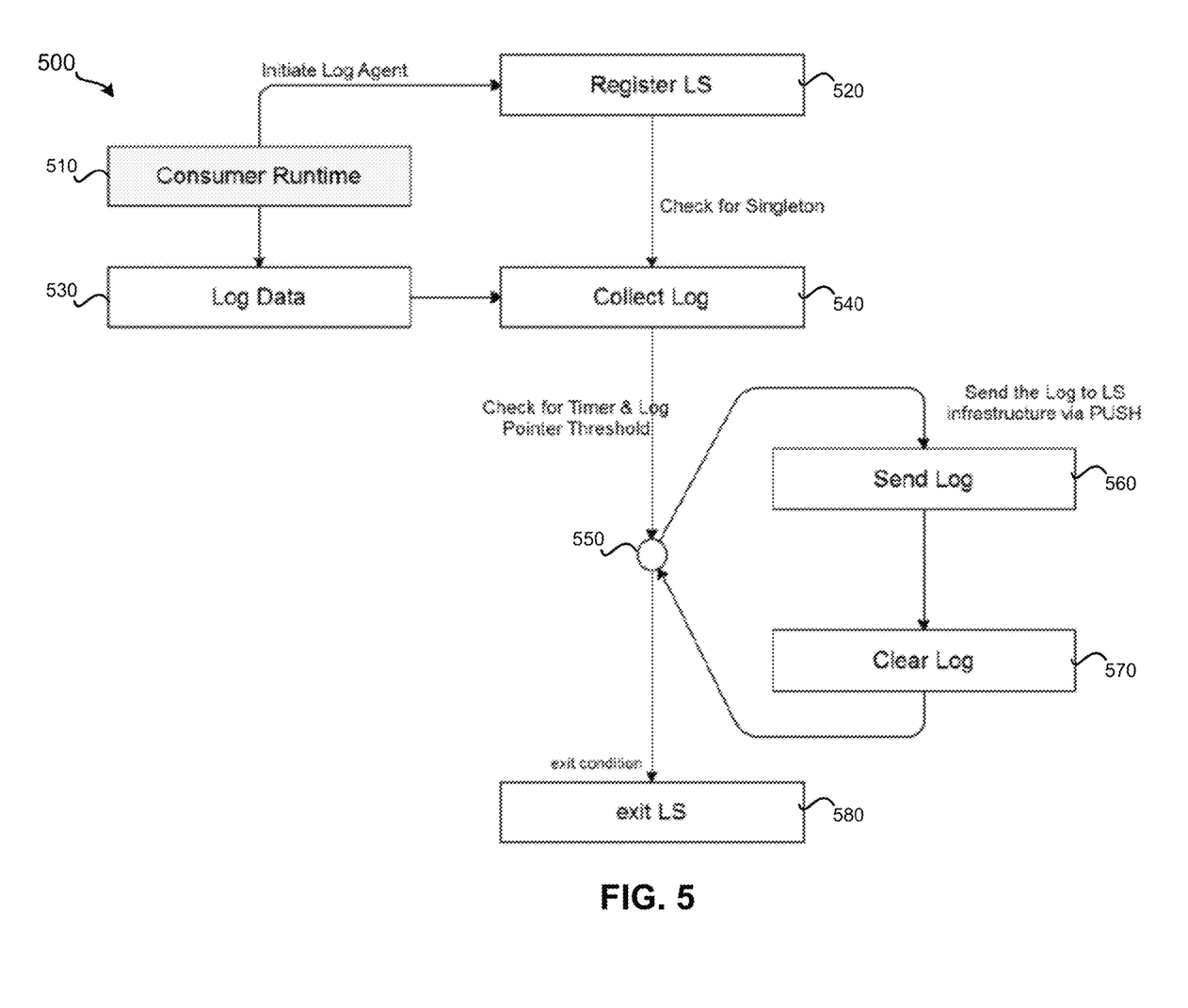
FIG. 5 illustrates a process for logging the execution of a vendor application.

FIG. 5 illustrates a process for logging the execution of a vendor application. Process 500 can begin with execution of the vendor application at 510. During consumer runtime of the vendor application, a decision can be made to log the execution of the vendor application. Process 500 can continue with registration of the vendor application to logging service 110 at 520. Upon registration, logging service 110 can ensure that an active log agent is present on the vendor application. If an active log agent is not present, logging service 110 can activate the log agent on the vendor application. Once the log agent is active, process 500 can continue by logging data at 530. Process 500 can collect the log data at 540. At 550, process 500 can check for timer and log pointer thresholds. A timer threshold is a timer that is set in the web page as an HTML tag. Within the timer threshold, log agent should transmit log data to logging service 110 to maintain the connection between the log agent and the logging service. Log pointer threshold is a threshold that specifies the maximum number of log entries that can be transmitted at once. When the number of log entries in the log agent reach the threshold, then the log entries are transmitted to the logging service. If the time or log pointer threshold is reached at 550, then process 500 can continue by transmitting the log entries to the logging service at 560. Once the log entries have been transmitted, process 500 can clear the log entries at 570. This process of collecting logs and transmitting logs can repeat until the execution of the vendor application ends, and process 500 ends by exiting the log agent at 580.

Figure 6:
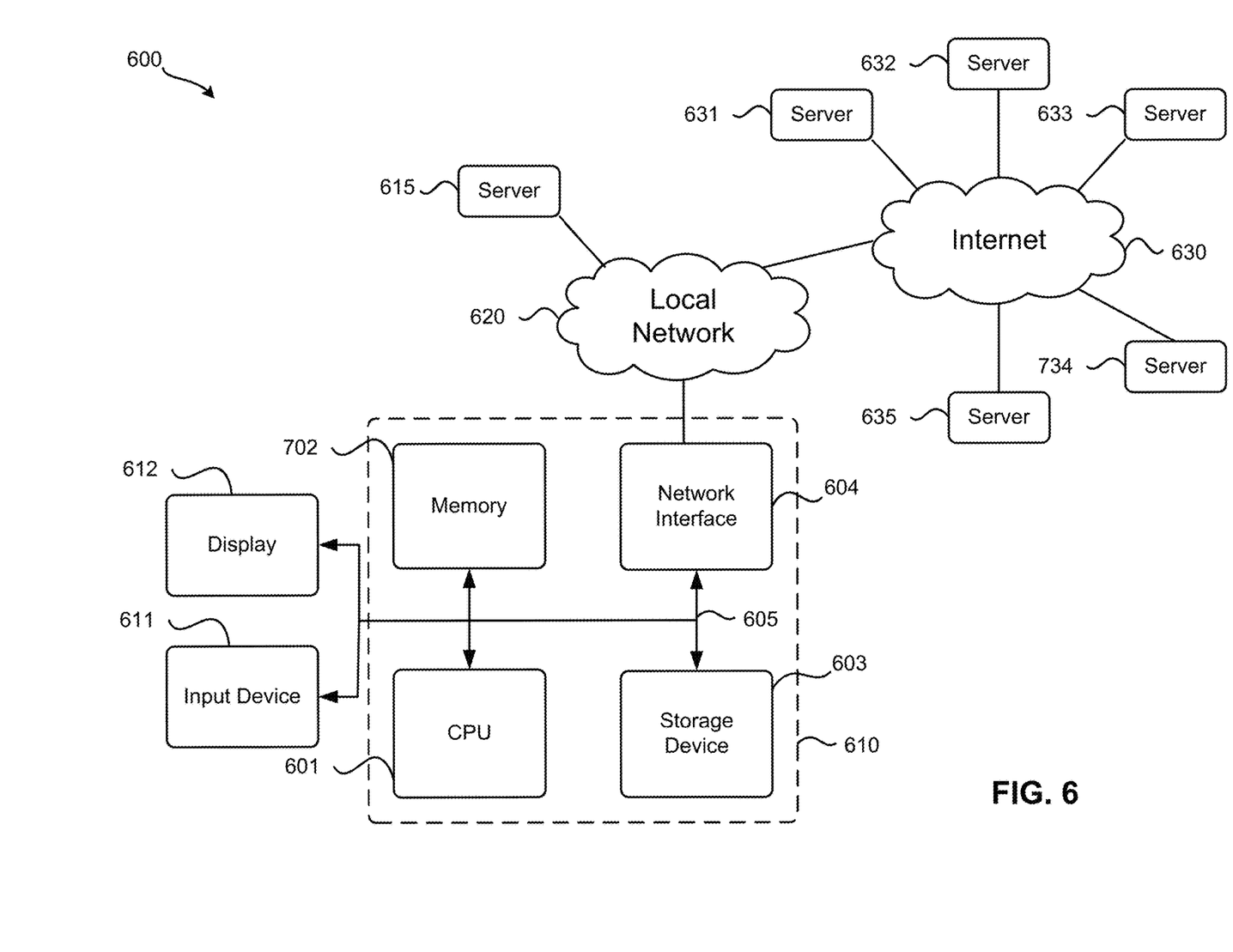
FIG. 6 illustrates an exemplary computer system according to one embodiment.

An exemplary computer system 600 is illustrated in FIG. 6. Computer system 610 includes a bus 605 or other communication mechanism for communicating information, and a processor 601 coupled with bus 605 for processing information. Computer system 610 also includes memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. For a computing device, a computer-implemented method comprising:
   receiving, by a processor of the computing device, a request from a log agent operating on a client device to transmit log data from the log agent to the computing device, the log agent configured to log or trace a vendor application running on the client device;
   establishing, by the processor of the computing device, a web-based connection with the log agent;
   receiving, by the processor of the computing device and over the web-based connection, the log data from the log agent, the log data generated during execution of the vendor application running on the client device;
   determining, by the processor of the computing device, a consumer preference setting associated with the client device from a plurality of consumer preference settings stored in a storage of the computing device; and
   storing, by the processor of the computing device, the log data in a log storage of the computing device according to the consumer preference setting.

2. The computer-implemented method of claim 1 further comprising:
   receiving, by the processor of the computing device, a vendor request for analysis related to the vendor application;

identifying, by the processor of the computing device, at least one log file that is related to the vendor application; and generating, by the processor of the computing device, log analysis based on the at least one log file.

3. The computer-implemented method of claim 2, wherein the at least one log file includes a first log file and a second log file, wherein the first log file includes data generated during the execution of the vendor application on a first technology platform and the second log file includes data generated during the execution of the vendor application on a second technology platform.

4. The computer-implemented method of claim 1, wherein storing the log data in the log storage comprises:

identifying, by the processor of the computing device, a storage mode from the consumer preference setting;

storing, by the processor of the computing device, the log data in a row within a table when the storage mode is tableOnly;

storing, by the processor of the computing device, the log data in a log file when the storage mode is fileOnly; and storing, by the processor of the computing device, metadata associated with the log data in a row within a table and the log data in a log file when the storage mode is tableAndFile.

5. The computer-implemented method of claim 1, wherein storing the log data in the log storage comprises:

identifying, by the processor of the computing device, an identifier associated with a consumer operating the vendor application; and storing, by the processor of the computing device, the log data in the log storage along with the identifier.

6. The computer-implemented method of claim 1, wherein the request is a first request, the log agent is a first log agent, the client device is a first client device, the log data is a first log data, the vendor application is a first vendor application, the web-based connection is a first web-based connection, and the consumer preference setting is a first consumer preference setting, the computer-implemented method further comprising:

receiving, by the processor of the computing device, a second request from a second log agent operating on a second client device to transmit second log data from the second log agent to the computing device, the second log agent configured to log or trace a second vendor application running on the second client device;

establishing, by the processor of the computing device, a second web-based connection with the second log agent;

receiving, by the processor of the computing device and over second the web-based connection, the second log data from the second log agent, the second log data generated during execution of the second vendor application running on the client device;

determining, by the processor of the computing device, a second consumer preference setting associated with the second client device from the plurality of consumer preference settings stored in the storage of the computing device; and storing, by the processor of the computing device, the second log data in the log storage of the computing device according to the second consumer preference setting.

7. The computer-implemented method of claim 1, wherein the log storage is a first log storage, wherein the consumer preference setting specifies an interval at which to perform backup operations, the computer-implemented method further comprising performing a set of backup operations based on the interval specified in the consumer preference setting by identifying log data in the first log storage associated with a consumer operating the vendor application and storing the identified log data in a second log storage of the computing device as a backup of the identified log data.

8. A non-transitory computer readable storage medium storing one or more programs executable on a computing device, the one or more programs comprising instructions for:

receiving a request from a log agent operating on a client device to transmit log data from the log agent to the computing device, the log agent configured to log or trace a vendor application running on the client device;

establishing a web-based connection with the log agent;

receiving, over the web-based connection, the log data from the log agent, the log data generated during execution of the vendor application running on the client device;

determining a consumer preference setting associated with the client device from a plurality of consumer preference settings stored in a storage of the computing device; and storing the log data in a log storage of the computing device according to the consumer preference setting.

9. The non-transitory computer readable storage medium of claim 8, the one or more programs further comprising instructions for:

receiving a vendor request for analysis related to the vendor application;

identifying at least one log file that is related to the vendor application; and generating log analysis based on the at least one log file.

10. The non-transitory computer readable storage medium of claim 9, wherein the at least one log file includes a first log file and a second log file, wherein the first log file includes data generated during the execution of the vendor application on a first technology platform and the second log file includes data generated during the execution of the vendor application on a second technology platform.

11. The non-transitory computer readable storage medium of claim 8, wherein storing the log data in the log storage comprises:

identifying a storage mode from the consumer preference setting;

storing the log data in a row within a table when the storage mode is tableOnly;

storing the log data in a log file when the storage mode is fileOnly; and storing metadata associated with the log data in a row within a table and the log data in a log file when the storage mode is tableAndFile.

12. The non-transitory computer readable storage medium of claim 8, wherein storing the log data in the log storage comprises:

identifying an identifier associated with a consumer operating the vendor application; and storing the log data in the log storage along with the identifier.

13. The non-transitory computer readable storage medium of claim 8, wherein the request is a first request, the log agent is a first log agent, the client device is a first client device, the log data is a first log data, the vendor application is a first vendor application, the web-based connection is a first web-based connection, and the consumer preference setting is a first consumer preference setting, the one or more programs further comprising instructions for:

receiving a second request from a second log agent operating on a second client device to transmit second log data from the second log agent to the computing device, the second log agent configured to log or trace a second vendor application running on the second client device;

establishing a second web-based connection with the second log agent;

receiving, over second the web-based connection, the second log data from the second log agent, the second log data generated during execution of the second vendor application running on the client device;

determining a second consumer preference setting associated with the second client device from the plurality of consumer preference settings stored in the storage of the computing device; and     storing the second log data in the log storage of the computing device according to the second consumer preference setting.

14. The non-transitory computer readable storage medium of claim 8, wherein the log storage is a first log storage, wherein the consumer preference setting specifies an interval at which to perform backup operations, the one or more programs further comprising performing a set of backup operations based on the interval specified in the consumer preference setting by identifying log data in the first log storage associated with a consumer operating the vendor application and storing the identified log data in a second log storage of the computing device as a backup of the identified log data.

15. A computer implemented system comprising:

a set of processing units; and a non-transitory computer-readable medium storing instructions that when executed by at least one processing unit in the set of processing units cause the at least one processing unit to:

receive a request from a log agent operating on a client device to transmit log data from the log agent to the computing device, the log agent configured to log or trace a vendor application running on the client device;

establish a web-based connection with the log agent;

receive, over the web-based connection, the log data from the log agent, the log data generated during execution of the vendor application running on the client device;

determine a consumer preference setting associated with the client device from a plurality of consumer preference settings stored in a storage of the computing device; and     store the log data in a log storage of the system according to the consumer preference setting.

16. The computer implemented system of claim 15 wherein the instructions further cause the at least one processing unit to:

receive a vendor request for analysis related to the vendor application;

identify at least one log file that is related to the vendor application; and     generate log analysis based on the at least one log file.

17. The computer implemented system of claim 16, wherein the at least one log file includes a first log file and a second log file, wherein the first log file includes data generated during the execution of the vendor application on a first technology platform and the second log file includes data generated during the execution of the vendor application on a second technology platform.

18. The computer implemented system of claim 15, wherein storing the log data in the log storage comprises:

identifying a storage mode from the consumer preference setting;

storing the log data in a row within a table when the storage mode is tableOnly;

storing the log data in a log file when the storage mode is fileOnly; and     storing metadata associated with the log data in a row within a table and the log data in a log file when the storage mode is tableAndFile.

19. The computer implemented system of claim 15, wherein storing the log data in the log storage comprises:

identifying an identifier associated with a consumer operating the vendor application; and     storing the log data in the log storage along with the identifier.

20. The computer implemented system of claim 15, wherein the request is a first request, the log agent is a first log agent, the client device is a first client device, the log data is a first log data, the vendor application is a first vendor application, the web-based connection is a first web-based connection, and the consumer preference setting is a first consumer preference setting, the instructions further cause the at least one processing unit to:

receive a second request from a second log agent operating on a second client device to transmit second log data from the second log agent to the computing device, the second log agent configured to log or trace a second vendor application running on the second client device;

establish a second web-based connection with the second log agent;

receive, over second the web-based connection, the second log data from the second log agent, the second log data generated during execution of the second vendor application running on the client device;

determine a second consumer preference setting associated with the second client device from the plurality of consumer preference settings stored in the storage of the computing device; and     store the second log data in the log storage of the computing device according to the second consumer preference setting.

\* \* \* \* \*